US006690390B1

(12) United States Patent
Walters et al.

(10) Patent No.: US 6,690,390 B1
(45) Date of Patent: Feb. 10, 2004

(54) INTERACTIVE ON-LINE HELP FOR COMPLETING A TASK

(75) Inventors: Kristy Walters, Austin, TX (US); Thomas Connell, Austin, TX (US); Christopher Cifra, Cedar Park, TX (US)

(73) Assignee: National Instruments Corporation, Austin, TX (US)

( * ) Notice: Subject to any disclaimer, the term of this patent is extended or adjusted under 35 U.S.C. 154(b) by 438 days.

(21) Appl. No.: 09/695,803

(22) Filed: Oct. 24, 2000

(51) Int. Cl.[7] ................................................ G09G 5/00
(52) U.S. Cl. ...................................... 345/705; 345/764
(58) Field of Search ................................ 345/705, 707, 345/762, 708, 733, 808, 764, 804; 707/3, 5, 102, 513, 531

(56) References Cited

U.S. PATENT DOCUMENTS

| 5,483,632 | A | | 1/1996 | Kuwamoto et al. | |
|---|---|---|---|---|---|
| 6,219,047 | B1 | * | 4/2001 | Bell | 345/705 |
| 6,297,822 | B1 | * | 10/2001 | Feldman | 345/705 |
| 6,327,589 | B1 | * | 12/2001 | Blewett et al. | 705/5 |
| 6,438,545 | B1 | * | 8/2002 | Beauregard et al. | 707/6 |

* cited by examiner

*Primary Examiner*—Cao (Kevin) Nguyen
(74) *Attorney, Agent, or Firm*—Meyertons Hood Kivlin Kowert & Goetzel, P.C.; Jeffrey C. Hood

(57) ABSTRACT

A computer system and method for performing a task within an application from within an on-line help information display. Thus the on-line help information displayed by the computer system may include user selectable elements which enable the user to complete portions or all of a task directly from the on-line help window, e.g., without requiring the user to search for this functionality in menus or toolbars within the application. The user may launch the application and then select on-line help information associated with performing a task within the application. In response to this user input, the computer may display on-line help information associated with the application. The displayed on-line help information may include various help information that specifies a recipe for performing the task, e.g., the information may guide the user through a series of steps to perform the task in the application. The displayed on-line help information may include one or more user selectable elements. In response to the user selecting a user selectable element, the application may perform at least a portion of the task within the application. Thus the user can perform a portion or all of a task by selecting an element or item directly from the on-line help information window. Thus the user is not required to manually search for the appropriate selection, such as a menu item or toolbar item, from within the application itself.

27 Claims, 13 Drawing Sheets

INTERACTIVE ON-LINE HELP FOR COMPLETING A TASK

FIELD OF THE INVENTION

The present invention relates to the field of computer software application programs, and more particularly to a method of completing a task within an application in a computer system directly from an on-line help window associated with the application.

DESCRIPTION OF THE RELATE ART

On-line help information is typically available in most commercial computer software application programs. On-line help is a method of displaying on a computer screen (e.g., display screen 110 shown in FIG. 1) context-sensitive information or documentation related to the tasks involved in using a computer software application program. Typically the content of on-line help information provided with a computer software application program is similar to the documentation for the product found in the various printed user and/or reference manuals. However, the on-line help information may be organized differently than the printed information.

One benefit on-line help usually provides is the ability for a user to search by keyword or concept, which may allow a user to quickly find the details to complete a particular task. Once a particular on-line help entry that describes a particular task is located by the user (by one of many methods: browsing, searching, following an internal link within the on-line help system), the user may then review the information presented. After reading and/or reviewing the on-line help description, the user may then perform the operations described.

It would be desirable for the user to have the capability to complete the operations through the on-line help system in an interactive manner. A benefit of a user having such a capability is that time would be saved by the user because the user would not have to locate the correct element (e.g., pull-down menu, toolbar) within the application necessary to complete the task. The more complex the computer software application program, the more time and effort the user would need to expend to find the correct element, and the more benefit the user would derive from the ability to complete operations interactively from within the on-line help windows.

Display of the on-line help information is usually done through a graphical user interface. There are various ways of displaying the on-line help information within the graphical user interface. A table of contents and an index to the on-line help data is usually provided. Within either the table of contents or the index, links may exist to guide a user to various locations within the on-line help data that may contain additional information related to the concept currently displayed to a user.

In some on-line help graphical user interfaces, there may be a push-button (e.g., a push-button labeled "Show Me") or some other icon or menu item displayed within a particular on-line help window that, when selected, moves the cursor to the area of the application that is described in the particular on-line help window. For example, within the Microsoft Word application program, the "Show Me" push-button associated with the "changing fonts" help window, when selected, moves the cursor to the formatting toolbar, to indicate where the formatting toolbar is located. However, the function of the described "Show Me" push-button is informational only (i.e., the font of any text that is currently selected is not changed). In order for the font of the selected text to be changed, the user must select the Formatting toolbar, and then select a font name in the Font box.

It would be desirable for the user to be able to complete the task from within the on-line help window, to simplify and/or speed up the completion of the task.

SUMMARY OF THE INVENTION

One embodiment of the present invention comprises a computer system and method for performing a task within an application from within an on-line help information display. Thus the on-line help information displayed by the computer system may include user selectable elements which enable the user to complete portions or all of a task directly from the on-line help window, e.g., without requiring the user to search for this functionality in menus or toolbars within the application.

In one embodiment of the method, the user may launch the application and then select online help information associated with performing a task within the application. In response to this user input, the computer may display on-line help information associated with the application, e.g., the on-line help information may be displayed in a window. The displayed on-line help information may include various help information that specifies a recipe for performing the task, e.g., the information may guide the user through a series of steps to perform the task in the application. The displayed on-line help information may include one or more user selectable elements according to one embodiment of the present invention. The one or more user selectable elements may be executable when selected to perform at least a portion of the task within the application. For example, the one or more user selectable elements may comprise at least a portion of the recipe for performing the task within the application. The user selectable elements may take any of various forms, such as highlighted words, graphical icons, etc.

The user may then select a user selectable element within the on-line help information. In response to the user selecting a user selectable element, the application may perform at least a portion of the task within the application in response to this user input selecting the user selectable element within the on-line help information. Thus the user can perform a portion or all of a task by selecting an element or item directly from the on-line help information window. Thus the user is not required to manually search for the appropriate selection, such as a menu item or toolbar item, from within the application itself.

In one embodiment, when the user selects the user selectable element within the on-line help information to perform a task, in addition to the task or portion thereof being performed in response to this selection; the corresponding selection element within the application, e.g., the menu item or toolbar item, is highlighted or otherwise appears to show the user how to perform this functionality from within the application. Alternatively, the highlighting of the menu item or toolbar item to show the user how to perform this functionality from within the application may require the user to request to be shown how to perform this functionality from within the application (e.g., the user request being accepted through the user selection of a push-button labeled "Show Me" or through the user selection of some other icon or menu item displayed within a particular on-line help window that, when selected, moves the cursor to the area of the application that is described in the particular on-line help window).

BRIEF DESCRIPTION OF THE DRAWINGS

A better understanding of the present invention can be obtained when the following detailed description of the preferred embodiment is considered in conjunction with the following drawings, in which.

Figure 1:
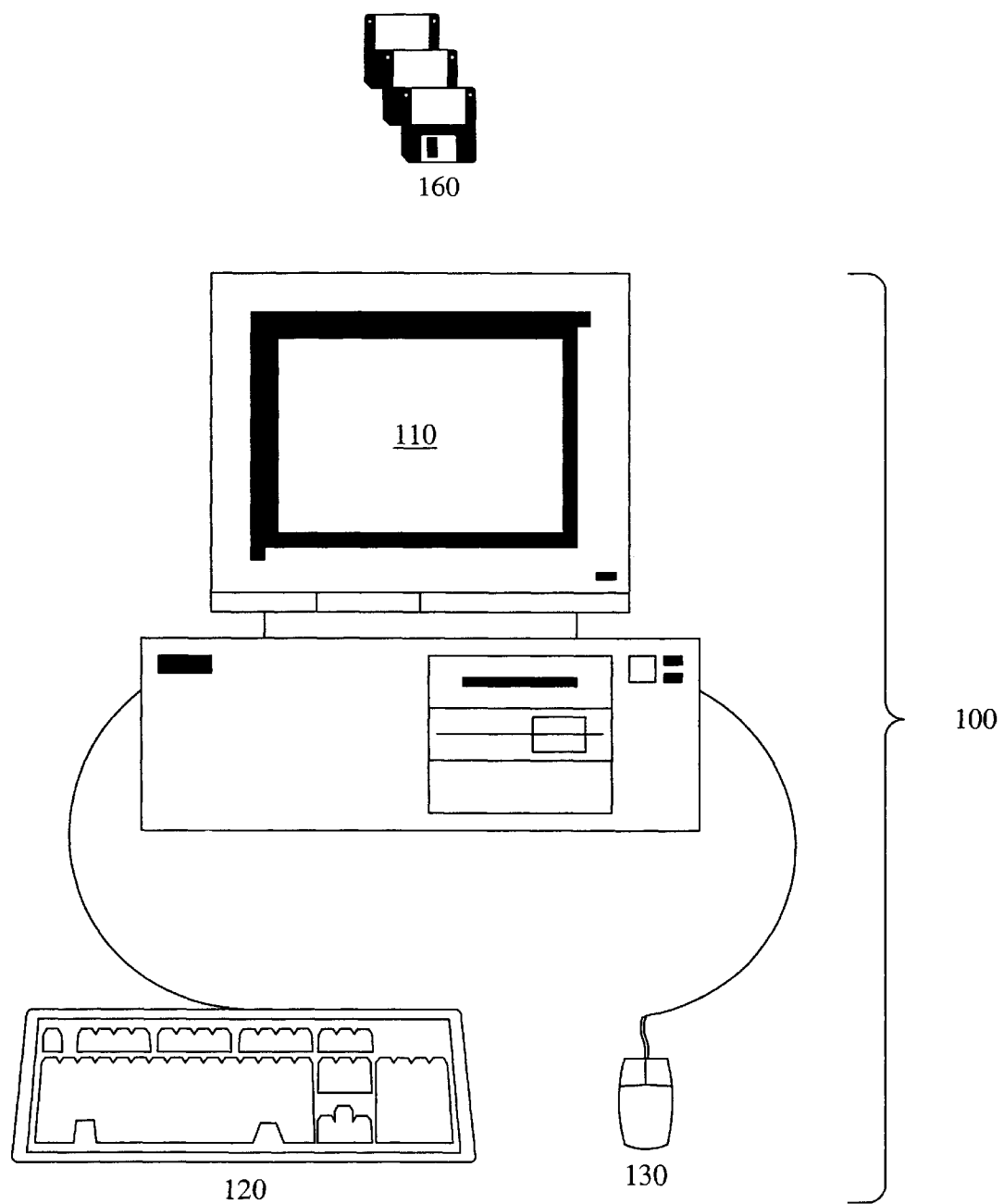
FIG. 1 is an illustrative computer system which is programmed according to one embodiment of the present invention and which operates according to one embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

FIG. 1—Exemplary Computer System

FIG. 1 illustrates an exemplary computer system 100 which is programmed according to one embodiment of the present invention and which operates according to one embodiment of the present invention. The computer system 100 may comprise a display screen 110, a keyboard 120, and a mouse 130 as shown. The computer system 100 may also include various standard components, including at least one central processing unit (CPU), memory, a hard drive, one or more buses, and a power supply.

The computer system 100 preferably includes a memory medium on which computer programs according to the present invention are stored. The term "memory medium" is intended to include various types of memory or storage, including an installation medium, e.g., a CD-ROM, or floppy disks 160, a computer system memory or random access memory such as DRAM, SRAM, EDO RAM, Rambus RAM, etc., or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution. Also, the computer system 100 may take various forms, including a personal computer system, mainframe computer system, workstation, network appliance, Internet appliance, personal digital assistant (PDA), television system or other device. In general, the term "computer system" can be broadly defined to encompass any device having a processor which executes instructions from a memory medium.

The memory medium preferably stores a software program for completing portions or all of a task within an application in a computer system through the use of interactive on-line help. The software program may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired. A CPU, such as the host CPU, executing code and data from the memory medium comprises a means for creating and executing the software program according to the methods or flowcharts described below.

Various embodiments further include receiving or storing instructions and/or data implemented in accordance with the foregoing description upon a carrier medium. Suitable carrier media include memory media or storage media such as magnetic or optical media, e.g., disk or CD-ROM, as well as signals such as electrical, electromagnetic, or digital signals, conveyed via a communication medium such as networks and/or a wireless link.

FIG. 2—Flowchart

Figure 2:
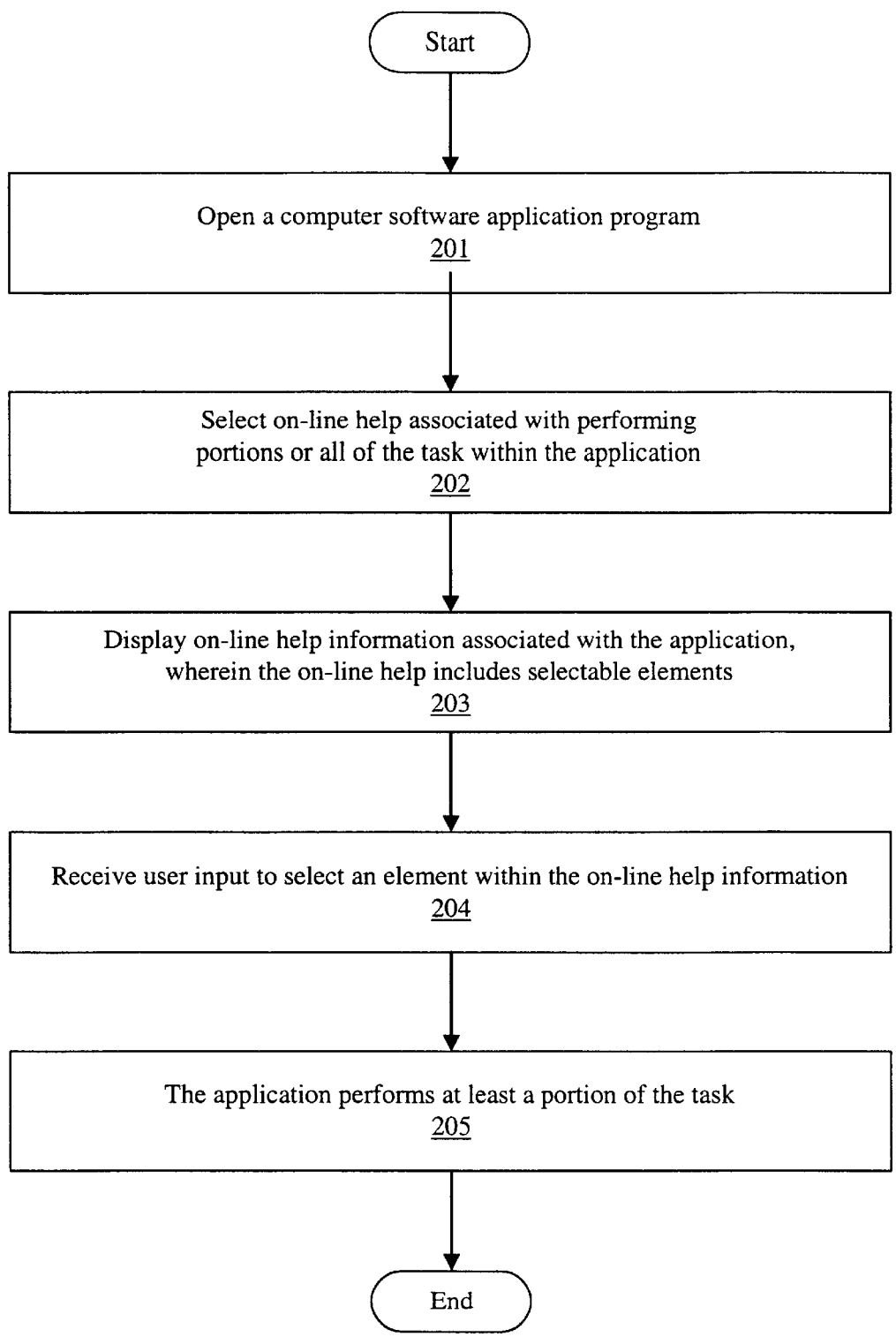
FIG. 2 is a flowchart illustrating performance of at least a portion of a task within the online help information according to one embodiment of the present invention.

FIG. 2 is a flowchart illustrating steps performed to complete portions or all of a task within an application in a computer system through the use of interactive on-line help according to one embodiment of the present invention.

In step 201 the application may be opened. In step 202 user input may be received where the user input is selection of on-line help associated with performing portions or all of the task within the application. In step 203 on-line help information associated with the application may be displayed including one or more user selectable elements, wherein the one or more user selectable elements are executable when selected to perform at least a portion of the task within the application. This on-line help information may be displayed graphically (i.e., in a graphical user interface) either within the same window as the application or alternatively in a separate window.

In step 204 user input may be received, wherein the user input is to select an element within the on-line help information to complete portions or all of the task within the application. The selected element may be enabled words. The selected element may be a graphical icon. The graphical icon may be a push-button. The on-line help information may guide a user through a series of tasks. The series of tasks may include configuration of the application. The on-line help information may be HTML-based help information, including DHTML elements such as JavaScript and/or ActiveX controls.

In step 205 the application may perform at least a portion of the task within the application in response to the user input selecting the user selectable element within the on-line help information. By enabling the user to complete at least a portion of the task directly from the online help display window, through the use of a selected element from within the on-line help display window, the user may save time because the user would not have to locate the correct element (e.g., pull-down menu, toolbar) within the application necessary to complete the task. Although a description of how to find the correct element within the application is generally described in the on-line help display window, it would take the user additional time to locate the correct element and select it, through the application, rather than simply selecting an enabled element within the on-line help display window. The more complex the computer software application program, the more time and effort the user would need to expend to find the correct element within the application, and the more benefit the user would derive from the ability to complete operations interactively from within the on-line help windows.

In one embodiment, when the user selects the user selectable element within the on-line help information to perform a task, in addition to the task or portion thereof being performed in response to this selection, the corresponding selection element within the application, e.g., the menu item or toolbar item, is highlighted or otherwise appears to show the user how to perform this functionality from within the application. Alternatively, the highlighting of the menu item or toolbar item to show the user how to perform this functionality from within the application may require the user to request to be shown how to perform this functionality from within the application (e.g., the user request being accepted through the user selection of a push-button labeled "Show Me" or through the user selection of some other icon or menu item displayed within a particular on-line help window that, when selected, moves the cursor to the area of the application that is described in the particular on-line help window). An example of highlighting a toolbar item in addition to performing the task would be shown by combining the screen shots of FIG. 8 and FIG. 9.

FIGS. 3–13: Exemplary Screen Shots

FIGS. 3–13 comprise screen shots which illustrate one example of the operation of the present invention. It is noted that the screen shots illustrate one example, and the present invention is not intended to be limited by this example.

Figure 3:
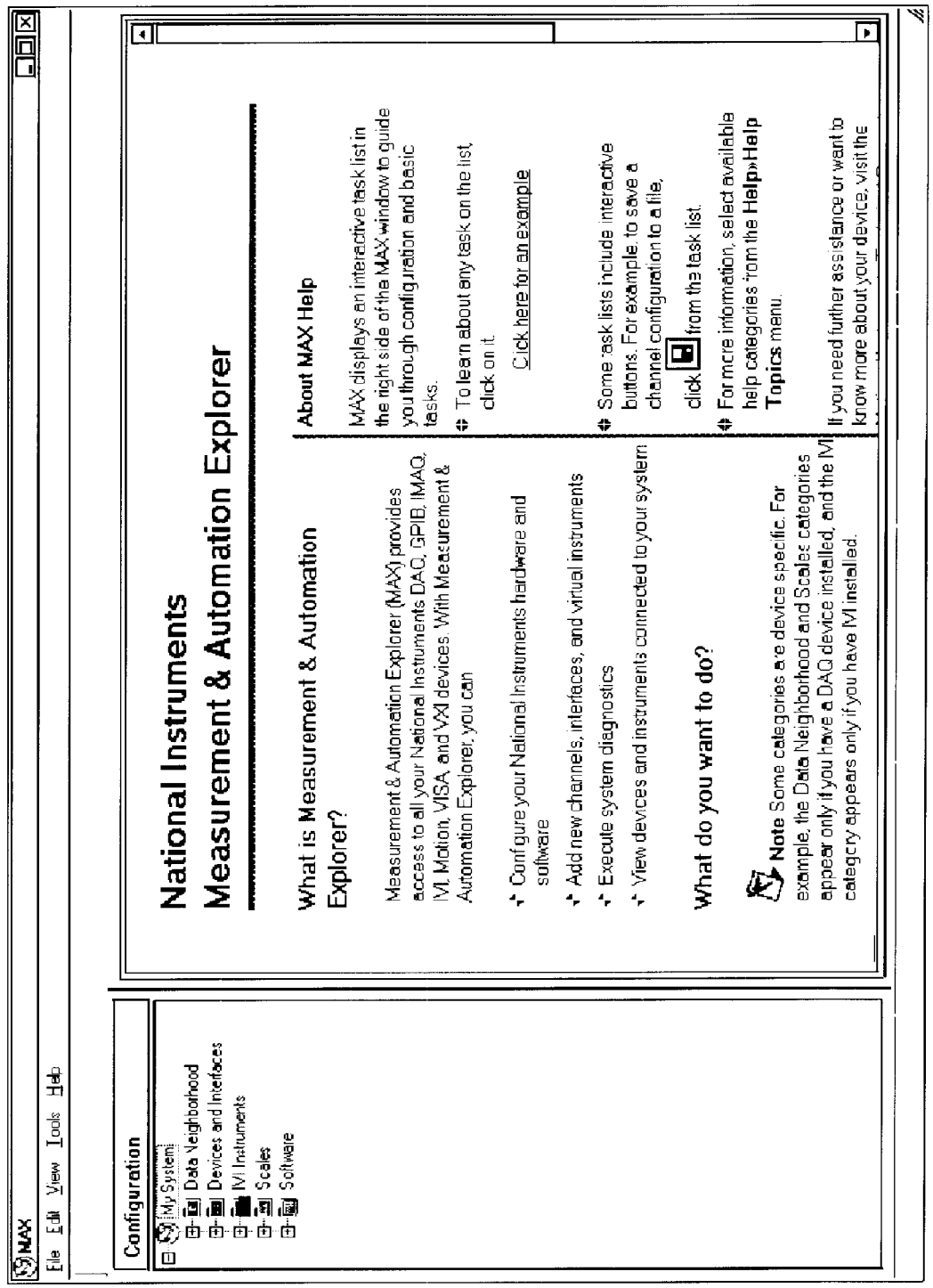
FIG. 3 is a screen shot of a main window of the MAX application according to one embodiment.

FIG. 3 illustrates a screen shot of a main window of the MAX application according to one embodiment of the present invention. The window on the left-hand side of the figure, labeled "Configuration" represents the Measurement & Automation Explorer (MAX) application. As shown, the top level menu item is labeled "My System". The sub-elements of "My System" include the following menu items: "Data Neighborhood", "Devices and Interfaces", "IVI Instruments", "Scales", and "Software". The plus signs (+) that appear to the left of each of the sub-element menu items indicate that additional sub-menus exist and are accessible by expanding the list by clicking or selecting a sub-element menu item.

The right-hand side of FIG. 3 contains the on-line help window for the main window of the MAX application. The text displayed in this initial on-line help window explains the overall purpose of the MAX application. In this embodiment, the on-line help window is displayed as an HTML window. Additional help information may be displayed by the user selecting HTML links (e.g., the "Click here for a example" link).

Figure 4:
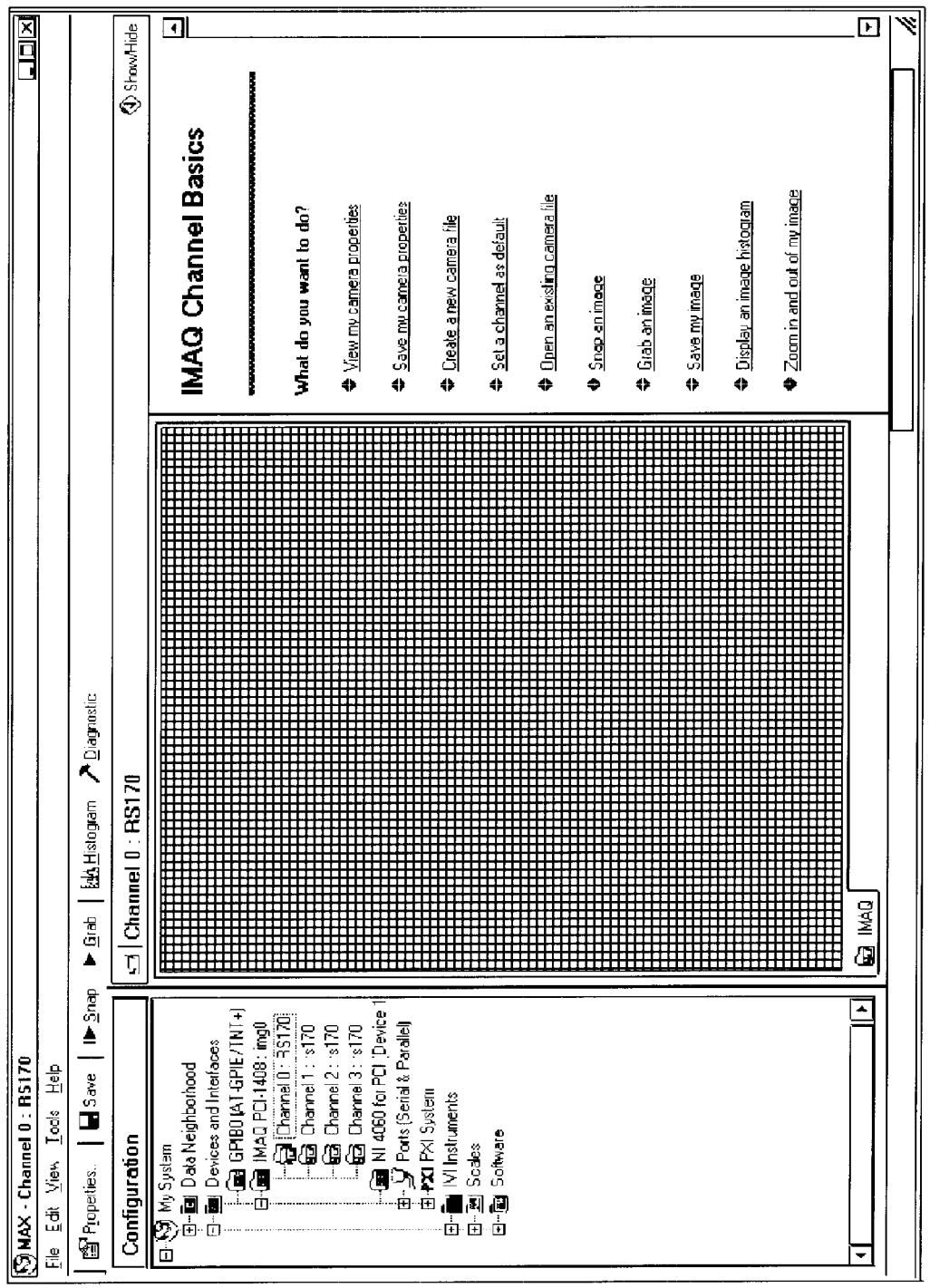
FIG. 4 is a screen shot of an initial channel window of the MAX application according to one embodiment.

FIG. 4 illustrates a screen shot of an initial channel window of the MAX application according to one embodiment of the present invention. One method of arriving at the screen shot shown in FIG. 4 from the window shown in FIG. 3 would be to expand the "Devices and Interfaces" sub-element of the "My System" top level menu item. The "Devices and Interfaces" sub-element is shown in FIG. 4 to include five sub-menu items, namely: "GPEBO", "IMAQ", "NI 4060", "Ports (Serial & Parallel)" and "PXI System". Two of these five sub-menu items ("GPIBO" and "NI 4060") have no further menu items below them, as shown by the absence of a plus sign (+) to the left of the terms. The other three sub-menu items each have a plus sign (+) indicating there is more detail available concerning these menu items. Further details are shown for the "IMAQ" sub-menu item, namely four channels: "Channel 0", "Channel 1", "Channel 2", and "Channel 3". The highlighted term "Channel 0" indicates that Channel 0 has been selected among the sub-menu items for the "IMAQ" sub-menu items. The selection of "Channel 0 " results in the IMAQ tabbed window that appears in the center of FIG. 4. The IMAQ tabbed window is entitled "Channel 0" and the tab that is illustrated at the bottom of the window is labeled "IMAQ". The content of the "Channel 0 " IMAQ tabbed window is empty.

On the right-hand side of FIG. 4, the context-sensitive on-line help information concerning IMAQ Channel windows is displayed. The user is prompted, within the on-line help window, with the question: "What do you want to do?". Choices of tasks available to the user that are relevant to the current position in the application program (i.e., in an MAQ Channel) include: "View my camera properties", "Save my camera properties", "Create a new camera file", "Set a channel as default", "Open an existing camera file", "Snap an image", "Grab an image", "Save my image", "Display an image histogram", and "Zoom in and out of my image". Additional relevant tasks may exist. Although not shown in the figure, if a scroll bar appears in the on-line help window, additional tasks may be accessed by adjusting the position of the cursor in the scroll bar, to reveal the links to additional tasks. By selecting any one of the tasks shown, additional information relevant to the completion of the selected task may be displayed either within the on-line help window, or perhaps within a separate pop-up window. Selection of the "Snap an image" task may result in the window shown in FIG. 5. Similarly, selection of the "Display an image histogram" task may result in the window shown in FIG. 7.

Figure 5:
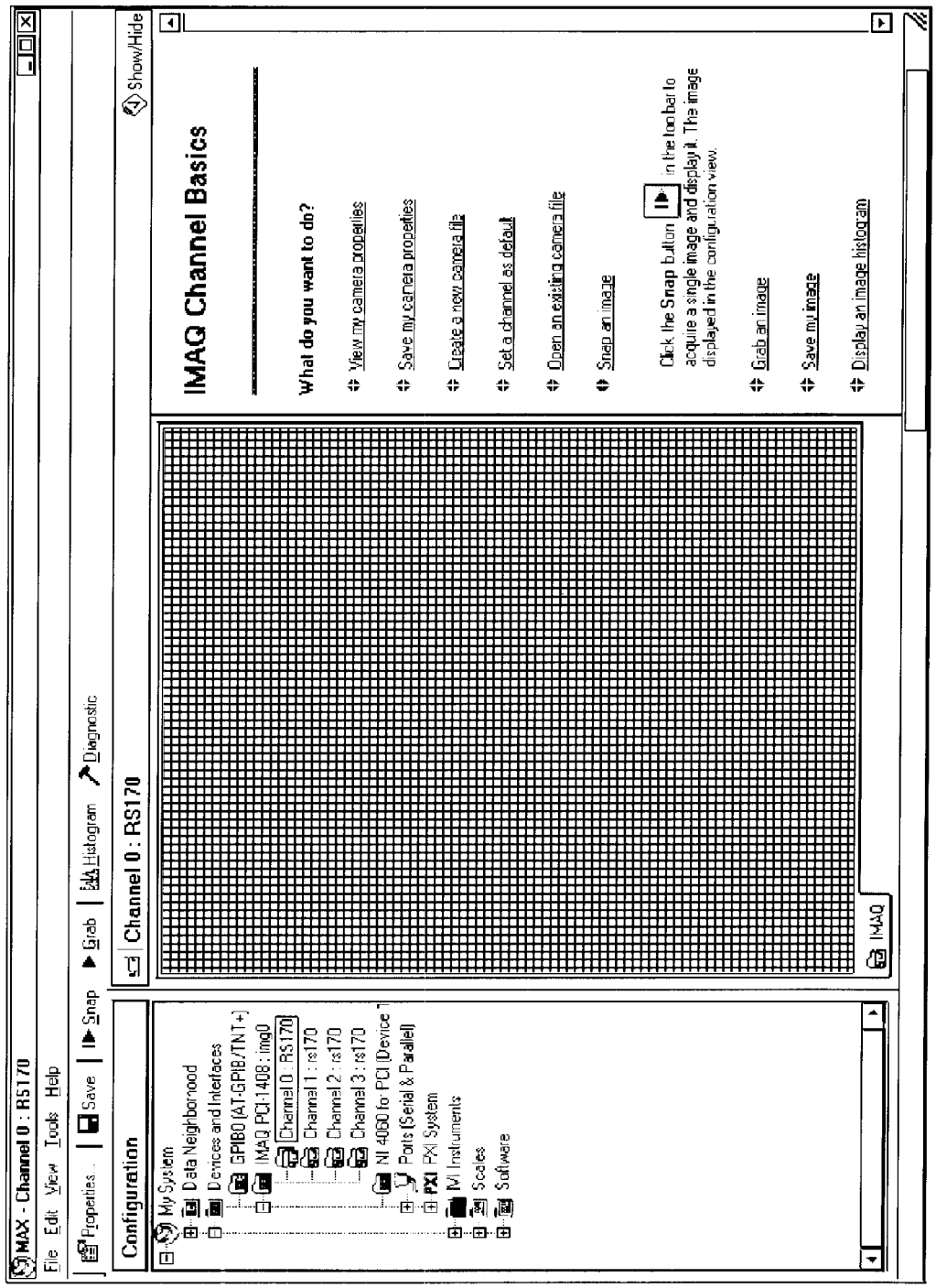
FIG. 5 is a screen shot of a first detailed on-line help entry for an IMAQ channel according to one embodiment.
Figure 6:
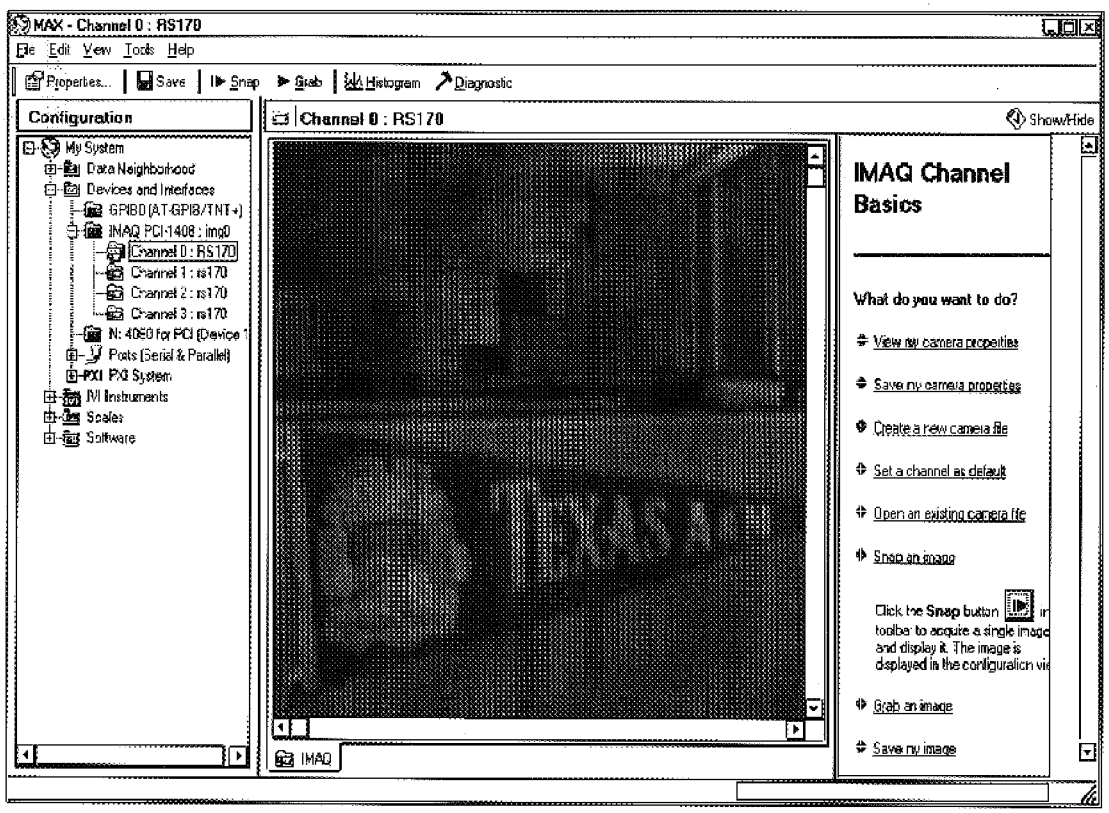
FIG. 6 is a screen shot of completion of a first task through the use of on-line help according to one embodiment.

FIG. 5 illustrates a screen shot of a first detailed on-line help entry for an IMAQ channel according to one embodiment of the present invention. As noted, selection of the "Snap an image" task shown in FIG. 4 results in the additional information relevant to the completion of the task of snapping an image to be displayed below the "Snap an image" task line. Accordingly, the "Grab an image" task line is moved down within the on-line help window so that the detailed "Snap an image" entry may be displayed. The detailed "Snap an image" entry may include the text: "Click the Snap button in the toolbar to acquire a single image and display it. The image is displayed in the configuration view."

along with an icon of a Snap button. If the user selects the Snap button that appears within the on-line help information window, the same functionality is invoked as if the user had located the toolbar, and clicked on the Snap button on the toolbar. Refer to FIG. 6 for an illustration of the results of clicking on the Snap button that appears within the on-line help information window.

FIG. 6 illustrates a screen shot of completion of a first task through the use of on-line help according to one embodiment of the present invention. The first task is the snapping of an image. The task is completed by clicking on the Snap button that appears within the on-line help information window. By allowing the user to instantly complete the task while the user is reading the on-line help information, without requiring the user to find the described "Snap" button on the toolbar, may increase the efficiency of the user's time while using the MAX application.

Figure 7:
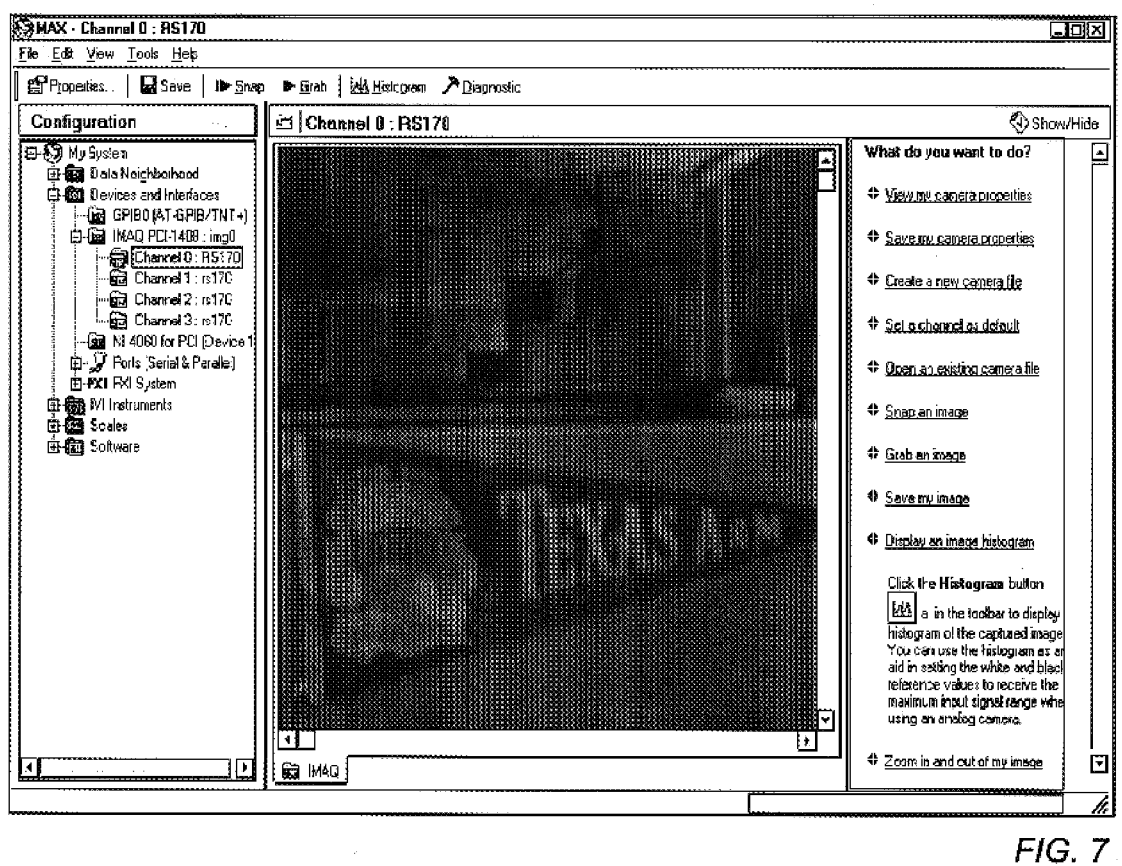
FIG. 7 is a screen shot of a second detailed on-line help entry for an IMAQ channel according to one embodiment.
Figure 8:
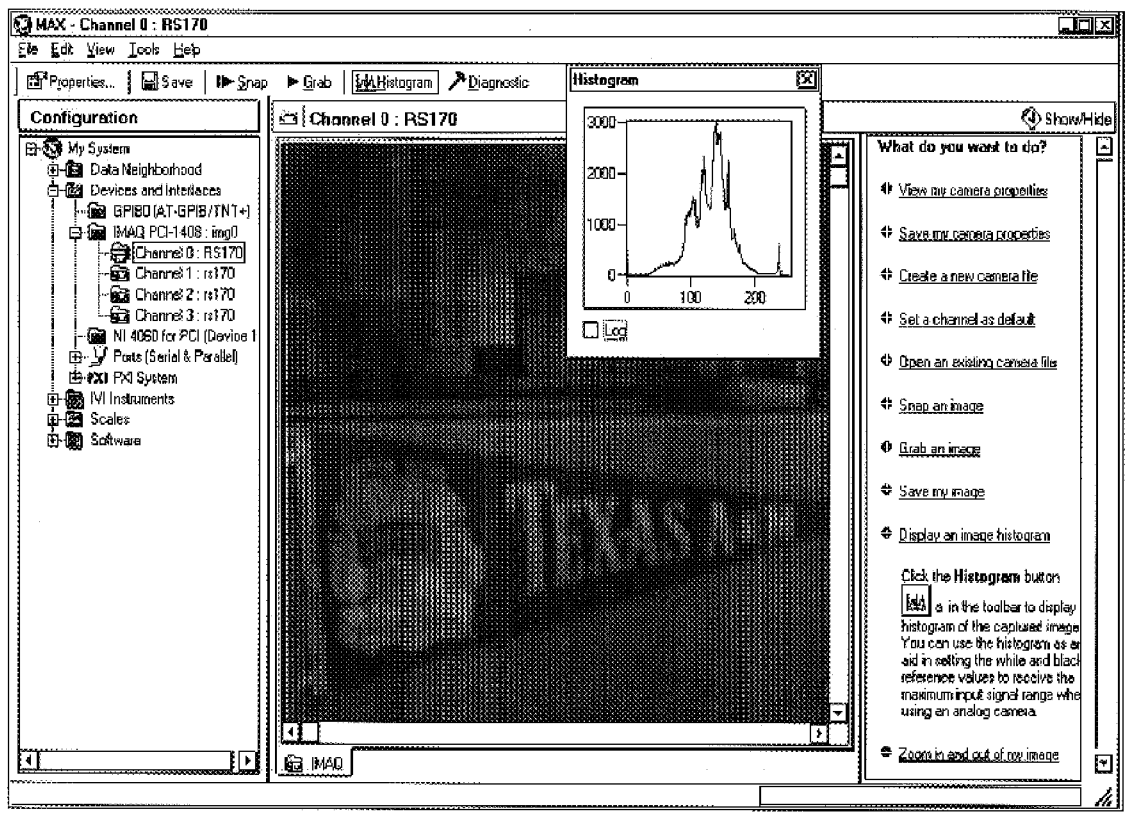
FIG. 8 is a screen shot of completion of a second task through the use of on-line help according to one embodiment.

FIG. 7 illustrates a screen shot of a second detailed on-line help entry for an IMAQ channel according to one embodiment of the present invention. Similar to the selection of the "Snap an image" task shown in FIG. 5, selection of the "Display an image histogram" task results in the additional information relevant to the completion of the task of displaying an image histogram to be displayed below the "Display an image histogram" task line. Accordingly, the "Zoom in and out of my image" task line is moved down within the on-line help window so that the detailed "Display an image histogram" entry may be displayed. The detailed "Display an image histogram" entry may include the text: "Click the Histogram button in the toolbar to display a histogram of the captured image. The histogram can be used as an aid in setting the white and black reference values to receive the maximum input signal range when using an analog camera." along with an icon of a Histogram button. If the user selects the Histogram button that appears within the on-line help information window, the same functionality is invoked as if the user had located the toolbar, and clicked on the Histogram button on the toolbar. Refer to FIG. 8 for an illustration of the results of clicking on the Histogram button that appears within the on-line help information window.

FIG. 8 illustrates a screen shot of completion of a second task through the use of on-line help according to one embodiment of the present invention. The second task is the displaying of an image histogram. The task is completed by clicking on the Histogram button that appears within the on-line help information window. By allowing the user to instantly complete the task while the user is reading the on-line help information, without requiring the user to find the described "Histogram" button on the toolbar, may increase the efficiency of the user's time while using the MAX application.

It is noted that the numbering of the tasks (i.e., first, second, and so on) is not in an effort to indicate that these tasks are required to be done in series with the first task required to be completed before the second task may be begun, but rather the numbering is used to uniquely distinguish between the various examples of tasks to be completed within an on-line help window.

Figure 9:
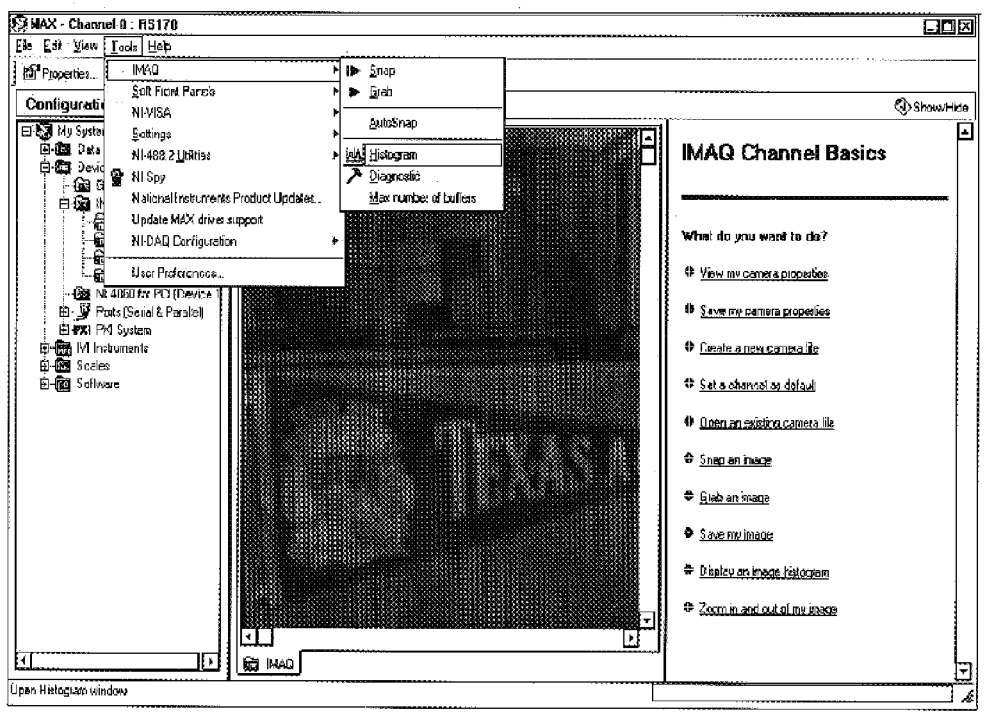
FIG. 9 is a screen shot of a prior art method to complete the second task shown in FIG. 8 through the application.

FIG. 9 illustrates a screen shot of a prior art method to complete the second task shown in FIG. 8 through the application. From the Tools pull-down menu the IMAQ menu item is selected, which results in another pull-down menu being displayed. The IMAQ pull-down menu includes "Snap" and "Histogram", among other items. The "Snap" menu item, if chosen, from the IMAQ pull-down menu would result in the same screen as shown in FIG. 6. Similarly, the "Histogram" menu item, if chosen, from the IMAQ pull-down menu would result in the same screen as shown in FIG. 8.

Figure 10:
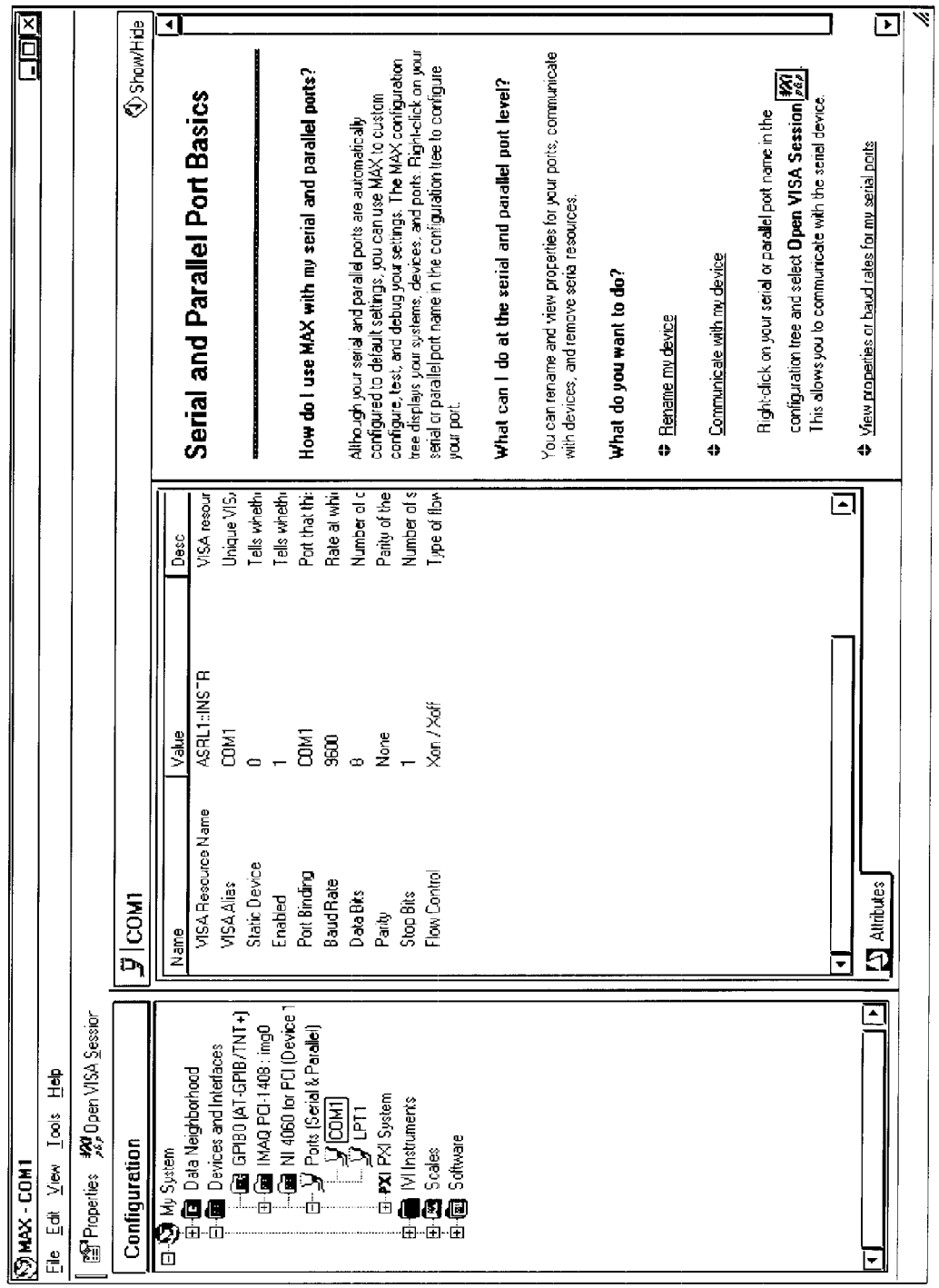
FIG. 10 is a screen shot of an initial COM1 Port window of the MAX application including a detailed on-line help entry according to one embodiment.

FIG. 10 illustrates a screen shot of an initial COM1 Port window of the MAX application including a detailed on-line help entry according to one embodiment of the present invention. The COM1 Port window is shown as a sub-element of "Ports (Serial & Parallel)" which in turn is a sub-element of "Devices and Interfaces". "Devices and Interfaces" is a sub-element of the root element, "My System" in the Configuration window shown on the left-hand side of FIG. 10. The highlighted term "COM1" indicates that COM1 has been selected among the sub-menu items for the "Ports (Serial & Parallel)" sub-menu items. The selection of "COM1" results in the Attributes tabbed window that appears in the center of FIG. 10. The Attributes tabbed window is entitled "COM1" and the tab that is illustrated at the bottom of the window is labeled "Attributes". The content of the "COM1" Attributes tabbed window includes three pieces of information (i.e., Name, Value, and Description) concerning various parameters or attributes of the COM1 port.

On the right-hand side of FIG. 10, the context-sensitive on-line help information concerning Serial & Parallel Port windows is displayed. The user is prompted, within the on-line help window, with the questions: "How do I use MAX with my serial and parallel ports?", "What can I do at the serial and parallel port level?", and "What do you want to do?". Choices of tasks available to the user that are relevant to the current position in the application program (i.e., in a or Serial or Parallel Port) include: "Rename my device", "Communicate with my device", and "View properties or baud rates for my serial ports". Additional relevant tasks may exist. By selecting any one of the tasks shown, additional information relevant to the completion of the selected task may be displayed either within the on-line help window, or perhaps within a separate pop-up window.

Details are shown in FIG. 10 for the "Communicate with my device" task, indicating that the "Communicate with my device" task was selected by the user. The selection of the "Communicate with my device" task results in the additional information relevant to the completion of the task of communicating with a device to be displayed below the "Communicate with my device" task line. Accordingly, the "View properties or baud rates for my serial ports" task line is moved down within the on-line help window so that the detailed "Communicate with my device" entry may be displayed. The detailed "Communicate with my device" entry may include the text: "Right-click on your serial or parallel port name in the configuration tree and select Open VISA session. This allows you to communicate with the serial device." along with an icon of an "Open VISA session" button. If the user selects the Open VISA session button that appears within the on-line help information window, the same functionality is invoked as if the user had located the toolbar, and clicked on the Open VISA session button on the toolbar. Refer to FIG. 1I for an illustration of the results of clicking on the Open VISA session button that appears within the online help information window.

Figure 11:
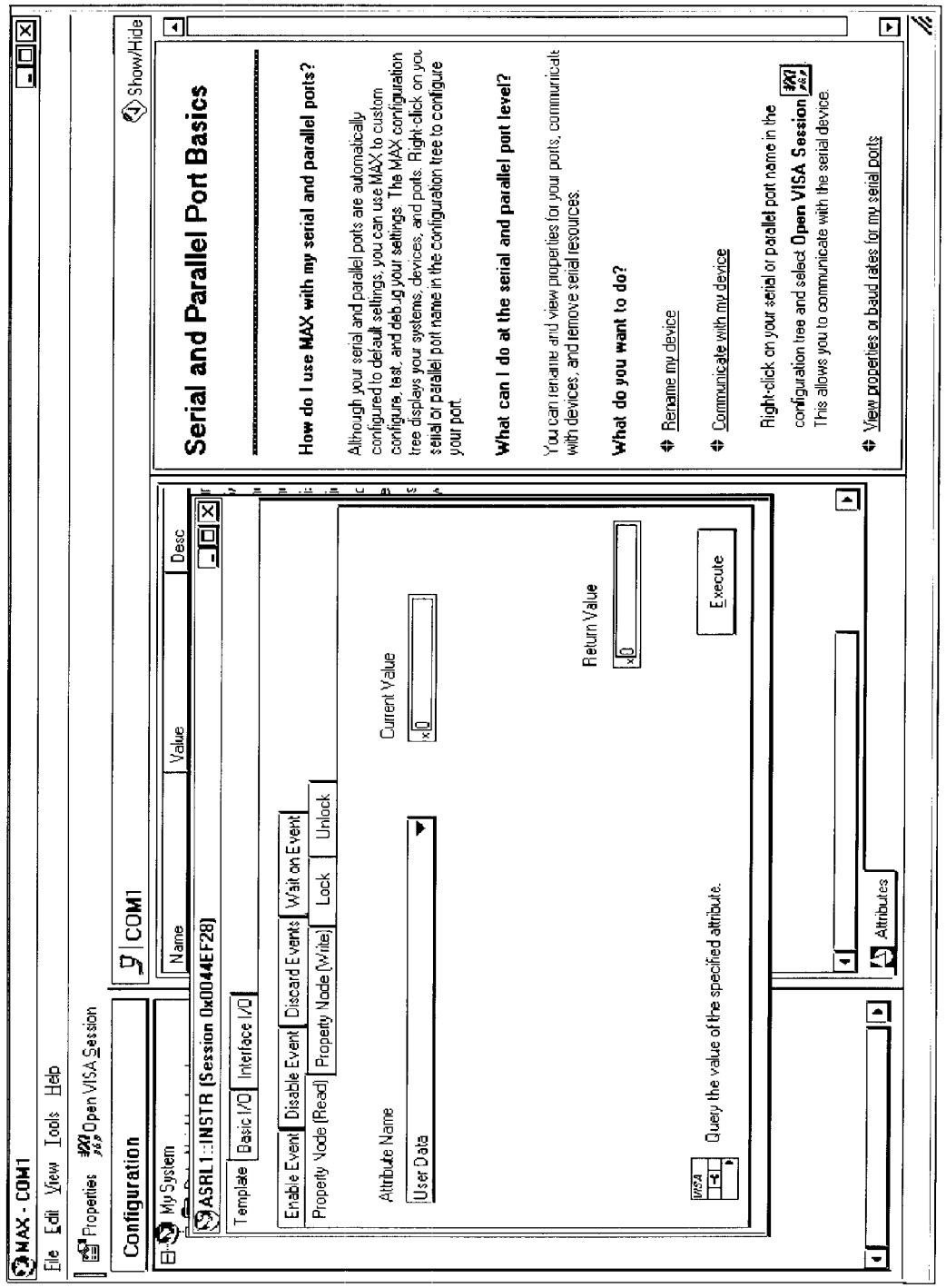
FIG. 11 is a screen shot of completion of a third task through the use of on-line help according to one embodiment.

FIG. 11 illustrates a screen shot of completion of a third task through the use of on-line help according to one embodiment of the present invention. The third task is the opening of a VISA session. The task is completed by clicking on the Open VISA session button that appears within the on-line help information window. By allowing the user to instantly complete the task while the user is reading the on-line help information, without requiring the user to find the described "Open VISA session" button on the toolbar, may increase the efficiency of the user's time while using the MAX application.

Figure 12:
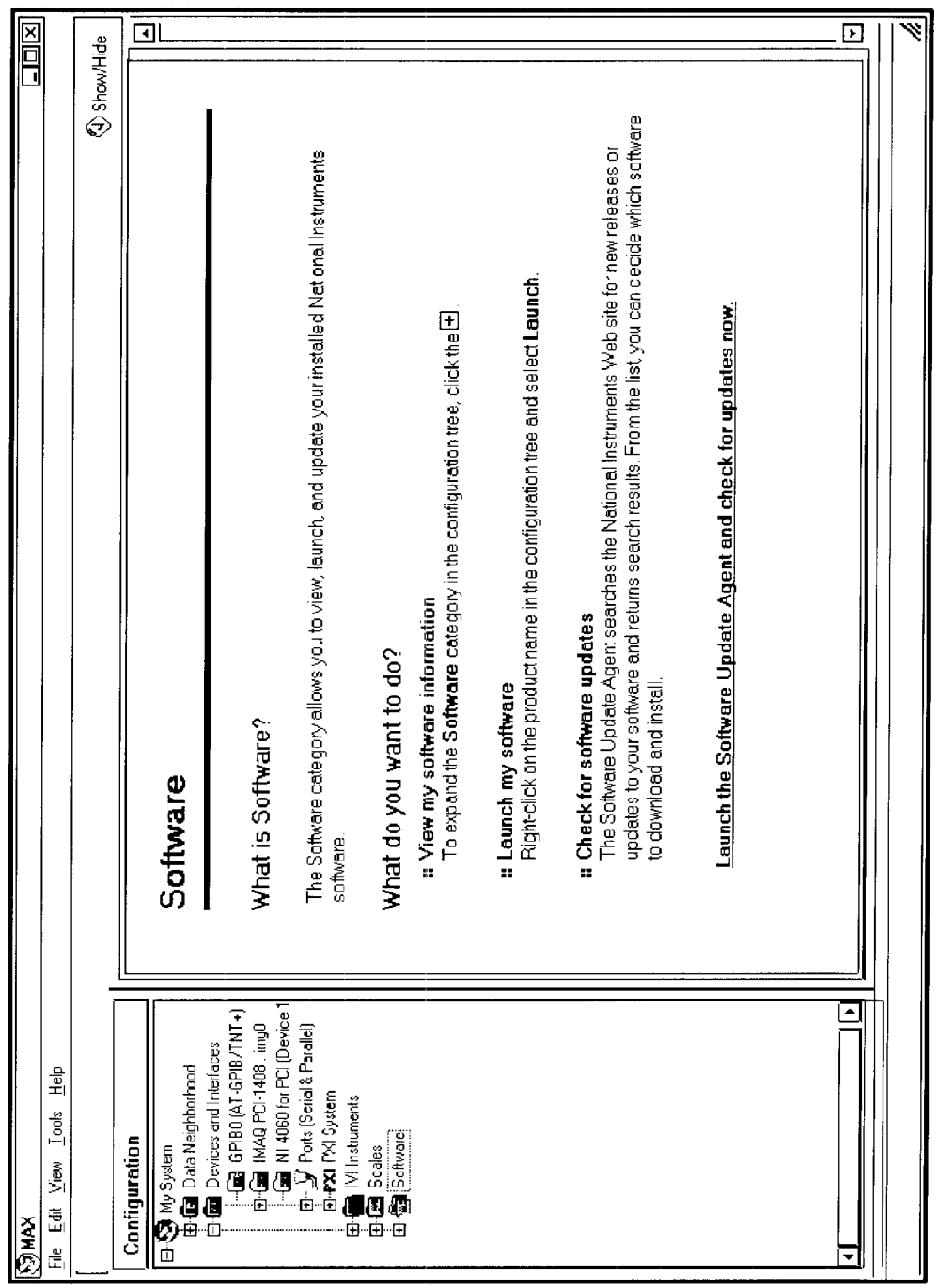
FIG. 12 is a screen shot of an initial Software window of the MAX application including a detailed on-line help entry according to one embodiment.
Figure 13:
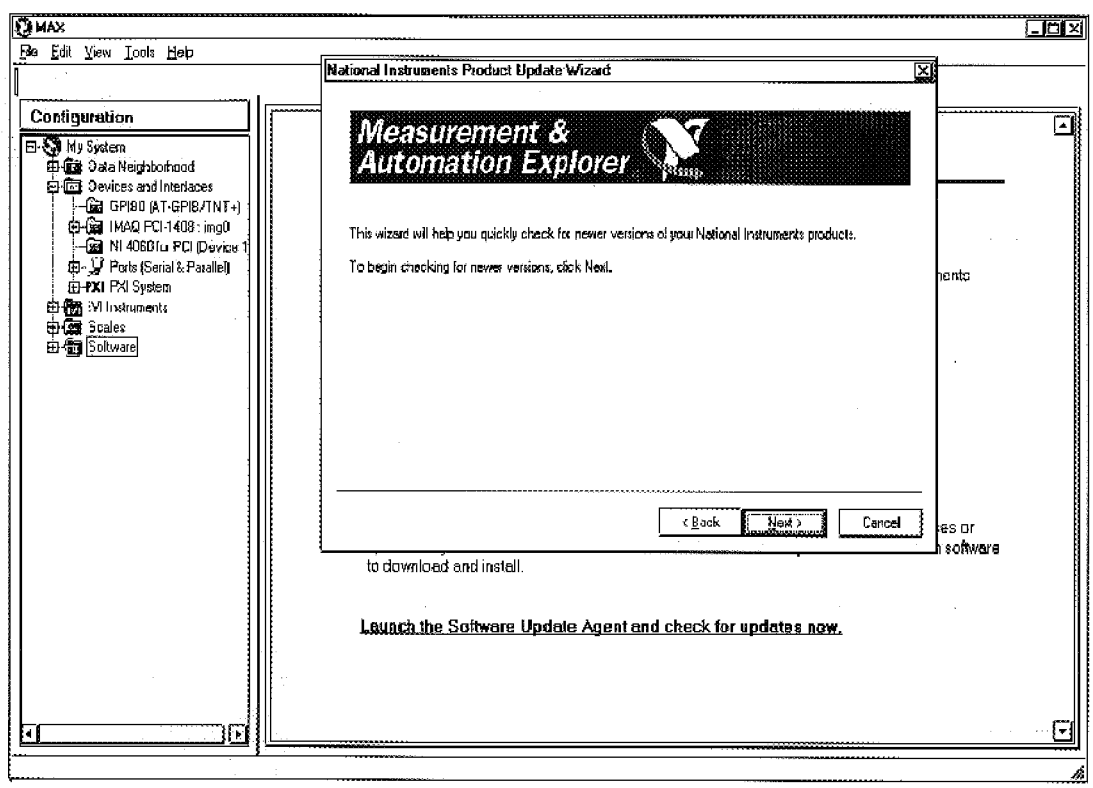
FIG. 13 is a screen shot of completion of a fourth task through the use of on-line help according to one embodiment.

FIG. 12 illustrates a screen shot of an initial Software window of the MAX application including a detailed on-line help entry according to one embodiment of the present invention. Under the heading "What do you want to do?", three items are discussed, with their details displayed. The detailed "Check for software updates" entry may include the text: "The Software Update Agent searches the National Instruments Web site for new releases or updates to your software and returns search results. From the list, you can decide which software to download and install." along with a phrase ("Launch the Software Update Agent and check for updates now") which is shown with an underline, indicating that it is "enabled" and will complete the task of launching the Software Update Agent, if selected. The same functionality (i.e., the opening or launching of the Software Update Agent) is invoked when the user clicks on or selects the "enabled words" as if the user had located the toolbar, and clicked on the application to be launched on the toolbar. Refer to FIG. 13 for an illustration of the results of clicking on the "enabled words" that appear within the on-line help information window.

FIG. 13 illustrates a screen shot of completion of a fourth task through the use of on-line help according to one embodiment of the present invention. The fourth task is the launching of the Software Update Agent. The task is completed by clicking on the "enabled words" that appear within the on-line help information window. By allowing the user to instantly complete the task while the user is reading the on-line help information, without requiring the user to find the described function on the toolbar, may increase the efficiency of the user's time while using the MAX application.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A method for performing a task within an application in a computer system, comprising:
   receiving user input to select on-line help associated with performing the task within the application;
   displaying on-line help information associated with the application, wherein the displayed on-line help information includes one or more user selectable elements, wherein the one or more user selectable elements are executable when selected to perform at least a portion of the task within the application;
   receiving user input to select a user selectable element within the on-line help information;
   performing at least a portion of the task within the application in response to the user input selecting the user selectable element within the on-line help information.

2. The method of claim 1, wherein the one or more user selectable elements comprise at least a portion of a recipe for performing the task within the application.

3. The method of claim 1, wherein the on-line help information displays information that specifies a recipe, wherein the information guides the user through a series of steps to perform the task in the application.

4. The method of claim 1, further comprising opening the application prior to displaying the on-line help information associated with the application.

5. The method of claim 1, wherein the user selectable element comprises one or more words displayed in the on-line help information.

6. The method of claim 1, wherein the user selectable element is a graphical icon displayed in the on-line help information.

7. The method of claim 6, wherein the graphical icon is a push-button.

8. The method of claim 1, wherein the task comprises configuration of the application.

9. The method of claim 1, wherein the on-line help information is HTML-based help information.

10. The method of claim 9, wherein the HTML-based help information comprises DHTML elements.

11. The method of claim 10, wherein the DHTML elements comprise one of: JavaScript or ActiveX controls.

12. A method for performing a task within an application in a computer system, comprising:
   receiving user input selecting on-line help information associated with performing the task within the application;
   displaying on-line help information associated with the application, wherein the displayed on-line help information includes one or more user selectable elements, wherein the one or more user selectable elements are executable when selected to perform at least a portion of the task within the application;
   receiving user input selecting a user selectable element within the on-line help information, wherein in response to the selected element the application performs at least a portion of the task within the application.

13. A computer system for performing a task within an application, the computer system comprising:
   a display;
   an input device;
   a memory which stores a software program for completing the task within the application;
   a CPU coupled to the memory, the display, and the input device, wherein the CPU is operable to execute the software program in the memory, wherein, in executing the software program, the CPU is operable to:
   receive user input to select on-line help associated with performing the task within the application;
   display on-line help information associated with the application, wherein the displayed on-line help information includes one or more user selectable elements, wherein the one or more user selectable elements are executable when selected to perform at least a portion of the task within the application;
   receive user input to select a user selectable element within the on-line help information;
   perform at least a portion of the task within the application in response to the user input selecting the user selectable element within the on-line help information.

14. The computer system of claim 13, wherein the one or more user selectable elements comprise at least a portion of a recipe for performing the task within the application.

15. The computer system of claim 13, wherein the on-line help information displays information that specifies a recipe, wherein the information guides the user through a series of steps to perform the task in the application.

16. The computer system of claim 13, further comprising opening the application prior to displaying the on-line help information associated with the application.

17. The computer system of claim 13, wherein the user selectable element comprises one or more words displayed in the on-line help information.

18. The computer system of claim 13, wherein the user selectable element is a graphical icon displayed in the on-line help information.

19. The computer system of claim 18, wherein the graphical icon is a push-button.

20. The computer system of claim 13, wherein the task comprises configuration of the application.

21. The computer system of claim 13, wherein the on-line help information is HTML-based help information.

22. The computer system of claim 21, wherein the HTML-based help information comprises DHTML elements.

23. The computer system of claim 22, wherein the DHTML elements comprise one of:

JavaScript or ActiveX controls.

24. A computer system for performing a task within an application, the computer system comprising:

a display;

an input device;

a memory which stores a software program for completing the task within the application;

a CPU coupled to the memory, the display, and the input device, wherein the CPU is operable to execute the software program in the memory, wherein, in executing the software program, the CPU is operable to:

receive user input selecting on-line help information associated with performing the task within the application;

display on-line help information associated with the application, wherein the displayed on-line help information includes one or more user selectable elements, wherein the one or more user selectable elements are executable when selected to perform at least a portion of the task within the application;

receive user input selecting a user selectable element within the on-line help information, wherein in response to the selected element the application performs at least a portion of the task within the application.

25. A carrier medium which stores program instructions, wherein the program instructions are executable to implement:

receiving user input to select on-line help associated with performing the task within the application;

displaying on-line help information associated with the application, wherein the displayed on-line help information includes one or more user selectable elements, wherein the one or more user selectable elements are executable when selected to perform at least a portion of the task within the application;

receiving user input to select a user selectable element within the on-line help information;

performing at least a portion of the task within the application in response to the user input selecting the user selectable element within the on-line help information.

26. The carrier medium of claim 25, wherein the carrier medium is a memory medium.

27. A carrier medium which stores program instructions, wherein the program instructions are executable to implement:

receiving user input selecting on-line help information associated with performing the task on within the application;

displaying on-line help information associated with the application, wherein the displayed on-line help information includes one or more user selectable elements, wherein the one or more user selectable elements are executable when selected to perform at least a portion of the task within the application;

receiving user input selecting a user selectable element within the on-line help information, wherein in response to the selected element the application performs at least a portion of the task within the application.

* * * * *